United States Patent
Huebner et al.

(10) Patent No.: US 8,616,163 B2
(45) Date of Patent: Dec. 31, 2013

(54) LEAN COMBUSTION METHOD FOR A RECIPROCATING INTERNAL COMBUSTION ENGINE

(75) Inventors: Walter Huebner, Baldham (DE); Udo Gerke, Schorndorf (DE); Ulrich Spicher, Herxheim (DE); Amin Velji, Karlsruhe (DE); Michael Hoenl, Karlsruhe (DE); Konstantinos Boulouchos, Zurich (CH); Norbert Peters, Aachen (DE); Olaf Roehl, Stuttgart (DE); Christof Schulz, Cologne (DE); Dennis Bensing, Bochum (DE); Christian Laemmle, Russikon (CH)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/463,932

(22) Filed: May 4, 2012

(65) Prior Publication Data
US 2012/0266848 A1   Oct. 25, 2012

Related U.S. Application Data

(63) Continuation of application No. PCT/EP2010/006024, filed on Oct. 2, 2010.

(30) Foreign Application Priority Data

Nov. 5, 2009  (DE) .......................... 10 2009 052 017

(51) Int. Cl.
*F02B 75/04*  (2006.01)
(52) U.S. Cl.
USPC ................... 123/48 AA; 123/78 A; 123/48 R

(58) Field of Classification Search
USPC ...... 123/48 A, 48 AA, 48 R, 311, 78 A, 78 B
See application file for complete search history.

(56) References Cited

U.S. PATENT DOCUMENTS

| 4,765,293 A | * | 8/1988 | Gonzalez | ..................... 123/275 |
| 6,105,550 A | | 8/2000 | Nieberding | |

(Continued)

FOREIGN PATENT DOCUMENTS

| DE | 198 18 596 A1 | 11/1999 |
| DE | 198 10 935 C2 | 3/2000 |

(Continued)

OTHER PUBLICATIONS

Richard Backhaus, "Ottomotor mit HCCI-Technik", von General Motors, pp. 482-485, MTZ 0612008 Jahrgang 69.
German Search Report dated Nov. 29, 2011 including partial English-language translation (Ten (10) pages).

(Continued)

*Primary Examiner* — Noah Kamen
*Assistant Examiner* — Long T Tran
(74) *Attorney, Agent, or Firm* — Crowell & Moring LLP

(57) ABSTRACT

A lean combustion method is provided for a four-stroke reciprocating internal combustion engine having a cylinder, in which a combustion chamber is delimited by a cylinder head and a piston is movable in a reciprocating manner, the piston being able to vary the volume of the combustion chamber. A fuel can be introduced directly into the combustion chamber, and at least one gas exchange inlet valve and one gas exchange outlet valve are provided for a gas exchange. An intermediate compression can be set in the combustion chamber at a gas exchange top dead center and a main compression can be set at an ignition top dead center.

7 Claims, 3 Drawing Sheets

(56) References Cited

U.S. PATENT DOCUMENTS

| | | | |
|---|---|---|---|
| 6,499,458 | B1 | 12/2002 | Nieberding |
| 6,516,774 | B2 * | 2/2003 | zur Loye et al. ............. 123/299 |
| 7,000,596 | B2 * | 2/2006 | Zurloye et al. ............. 123/435 |
| 7,325,529 | B2 * | 2/2008 | Ancimer et al. ............. 123/299 |
| 7,610,900 | B2 * | 11/2009 | Lippert et al. ............. 123/445 |
| 2002/0104492 | A1 * | 8/2002 | Cowans ............. 123/48 R |
| 2005/0072402 | A1 * | 4/2005 | Zurloye et al. ............. 123/304 |
| 2006/0219215 | A1 | 10/2006 | Brachert et al. |
| 2007/0209633 | A1 | 9/2007 | Brachert et al. |
| 2010/0083934 | A1 * | 4/2010 | Huebner et al. ............. 123/299 |
| 2011/0276255 | A1 * | 11/2011 | Haskara et al. ............. 701/105 |

FOREIGN PATENT DOCUMENTS

| | | |
|---|---|---|
| DE | 103 50 797 A1 | 5/2005 |
| DE | 103 50 800 A1 | 5/2005 |
| DE | 10 2005 029 077 A1 | 1/2007 |
| DE | 10 2007 016 278 A1 | 10/2008 |
| EP | 1 681 452 A1 | 7/2006 |

OTHER PUBLICATIONS

International Search Report dated Feb. 3, 2011 including English-language translation (Six (6) pages).

\* cited by examiner

LEAN COMBUSTION METHOD FOR A RECIPROCATING INTERNAL COMBUSTION ENGINE

CROSS-REFERENCE TO RELATED APPLICATIONS

This application is a continuation of PCT International Application No. PCT/EP2010/006024, filed Oct. 2, 2012, which claims priority under 35 U.S.C. §119 from German Patent Application No. DE 10 2009 052 017.1, filed Nov. 5, 2009, the entire disclosures of which are herein expressly incorporated by reference.

BACKGROUND AND SUMMARY OF THE INVENTION

The invention relates to a lean combustion method for a reciprocating internal combustion engine having a cylinder, in which a combustion chamber is delimited by a cylinder head and a piston that can be moved in a reciprocating manner, the piston being able to vary the volume of the combustion chamber, and wherein a fuel can be introduced directly into the combustion chamber. At least one charge cycle intake valve and one charge cycle exhaust valve are provided for a charge cycle. An intermediate compression can be set in the combustion chamber at a charge cycle top dead center, and a main compression can be set at an ignition top center, after an expansion phase.

In the case of HCCI (homogeneous charge compression ignition) methods and CAI (controlled auto ignition) methods, which are in the development stage, the start of the ignition (auto-ignition) is controlled by way of the temperature by the amount of the exhaust gas recirculation rate (AGR). The necessarily high exhaust gas recirculation rate is set, for example, by an early closing of the charge cycle exhaust valves, i.e. before the charge cycle top dead center (LWOT). This leads to a negative valve overlap between the charge cycle intake valve and the charge cycle exhaust valve, because the charge cycle intake valve will open only after the charge cycle top dead center (LWOT) and therefore results in an intermediate compression in the charge cycle top dead center (LWOT).

By way of a pre-injection during this intermediate compression, it becomes possible to either raise the temperature (while the injected fuel is partially or completely converted), or intermediate products are formed, which result in an increase of the ignition performance of the mixture. By way of this pre-injection, the start of the auto-ignition can be influenced. Corresponding examples are indicated, for example, in German Patent document DE 198 10 935 C2, on which the present invention is based. DE 198 10 935 C2 basically describes a method of operating a four-stroke reciprocating internal combustion engine with a homogeneous lean basic mixture of air, fuel and retained exhaust gas, as well as with a compression ignition and a direct fuel injection into the combustion chamber, whose volume changes cyclically and which can be filled with intake gas through at least one inlet element, and the combustion exhaust gases can be pushed through at least one outlet element at least partly out of the combustion chamber. In this case, in an activating phase, the retained exhaust gas is compressed in the area of the charge cycle top dead center and subsequently is expanded and that, in this phase of the operating cycle, activation fuel for stabilizing the main combustion is injected into the combustion chamber.

Furthermore, in DE 198 10 935 C2, the pre-injection of fuel is used for the stabilization of the main combustion and expansion of the operating range to low loads. In the case of a complete combustion of the fuel, the thermal energy of the retained exhaust gas is increased for ensuring the combustion of the next cycle. If the combustion is incomplete, at least the chemical activity of the retained amount of exhaust gas is increased (formation of radicals, activation) without clearly increasing the temperature in the process. The amount of fuel converted to activated fuel is to be controlled by way of the point-in-time of the pre-injection.

A distribution of the injected fuel quantity that is as homogeneous as possible is a requirement in this case. In reality, however, at the points-in-time of the injection in the area of the charge cycle top dead center, i.e., at temperatures at which the ignition delay time of fuel is in the required time range, the fuel will already react before a homogeneous distribution of the fuel is present in the combustion chamber. In these cases, the degree of homogenization will vary from one working cycle to the next, and a control of converted to activated fuel will not be possible in reality. This effect is still intensified by temperature fluctuations in the retained exhaust gas and fluctuations in the degree of the charge motion.

Thus, by means of the method described in DE 198 10 935 C2, the desired stabilization of the main combustion by activation is only theoretical but cannot be shown in practice.

It is an object of the present invention to provide a robust method for stabilizing the main combustion that can be implemented in practice.

This and other objects are achieved by a lean combustion method for a four-stroke reciprocating internal combustion engine having a cylinder, in which a combustion chamber is delimited by a cylinder head and a piston that can be moved in a reciprocating manner, the piston being able to vary the volume of the combustion chamber, and wherein a fuel can be introduced directly into the combustion chamber. At least one charge cycle intake valve and one charge cycle exhaust valve are provided for a charge cycle. An intermediate compression can be set in the combustion chamber at a charge cycle top dead center, and a main compression can be set at an ignition top dead center, after an expansion phase. For a controlled conversion of a pilot quantity of fuel to intermediate products ($CH_2O$, $H_2O_2$, $CO$, $C_2H_4$, $C_3H_4$, etc.) and/or the complete combustion products ($CO_2$, $H_2O$):

(a) the introduction of the pilot quantity of fuel takes place at the latest by the charge cycle top dead center, (b) a maximal intermediate-compression temperature can be set by varying the closing point-in-time of the charge cycle exhaust valve, (c) a maximal intermediate-compression temperature can be set by varying the opening point-in-time of the charge cycle intake valve before the charge cycle top dead center LWOT, and/or (d) a variable compression during the intermediate compression, and/or the mass of the pilot quantity of the fuel, can be varied.

In order to achieve a sufficient homogenization of the pre-injected fuel quantity, the latter has to be injected in the time periods in which the retained exhaust gas has conditions (temperature, pressure, air ratio) which are uncritical in the case of the present ignition delay times; i.e., the fuel reacts very slowly, so that sufficient time remains for the homogenization. This can most easily be achieved by an injection immediately after the charge cycle exhaust valve closes (AS). At that point-in-time, the temperature of the retained exhaust gas will be the lowest, and the time period to the desired reaction will be the longest.

Since, by way of the injection or the jet design of the fuel, no "perfect" homogenization can be carried out, the time from the injection point-in-time of the fuel to the reaction can be utilized for assisting the homogenization by corresponding measures, such as increasing the charge motion or the degree of turbulence. The increase of the degree of turbulence can take place, for example, by a variable valve stroke, by valve stroke phasing (different charge cycle valve stroke courses for equally acting charge cycle valves) on the exhaust side, quench areas in the combustion chamber, etc. These are measures known to a person skilled in the art. The then still existing fluctuations of the degree of homogenization will largely be negligible.

Because, in the case of a control of the activated or converted fuel by way of the point-in-time of the pre-injection will no longer be possible, the following method is provided.

In the case of the given homogenization, the ignition delay time of the fuel essentially depends on the temperature, the pressure and the air ratio in the combustion chamber. This is additionally influenced by the rotational speed of the internal-combustion engine because the "time-related aspects" depend on the rotational speed.

If the dependencies of the ignition delay time on the temperature, the pressure and the air ratio at different rotational speeds are known, according to the invention, the desired quantity of converted or activated fuel can be set and controlled by way of these values.

These quantities can be easily set, for example, by the point-in-time for the closing of the charge cycle exhaust valve (AS), and the pre-injection quantity of fuel.

By means of the method according to the invention, the HCCI operating range can be expanded without any problem while the consumption, NOx emissions and combustion noise are reduced. Furthermore, the method according to the invention is a lean combustion method that can be used worldwide for different fuel qualities. Advantageously, the expenditures and costs for the exhaust gas aftertreatment are reduced because costly lean exhaust gas aftertreatment with high technical expenditures can be eliminated.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
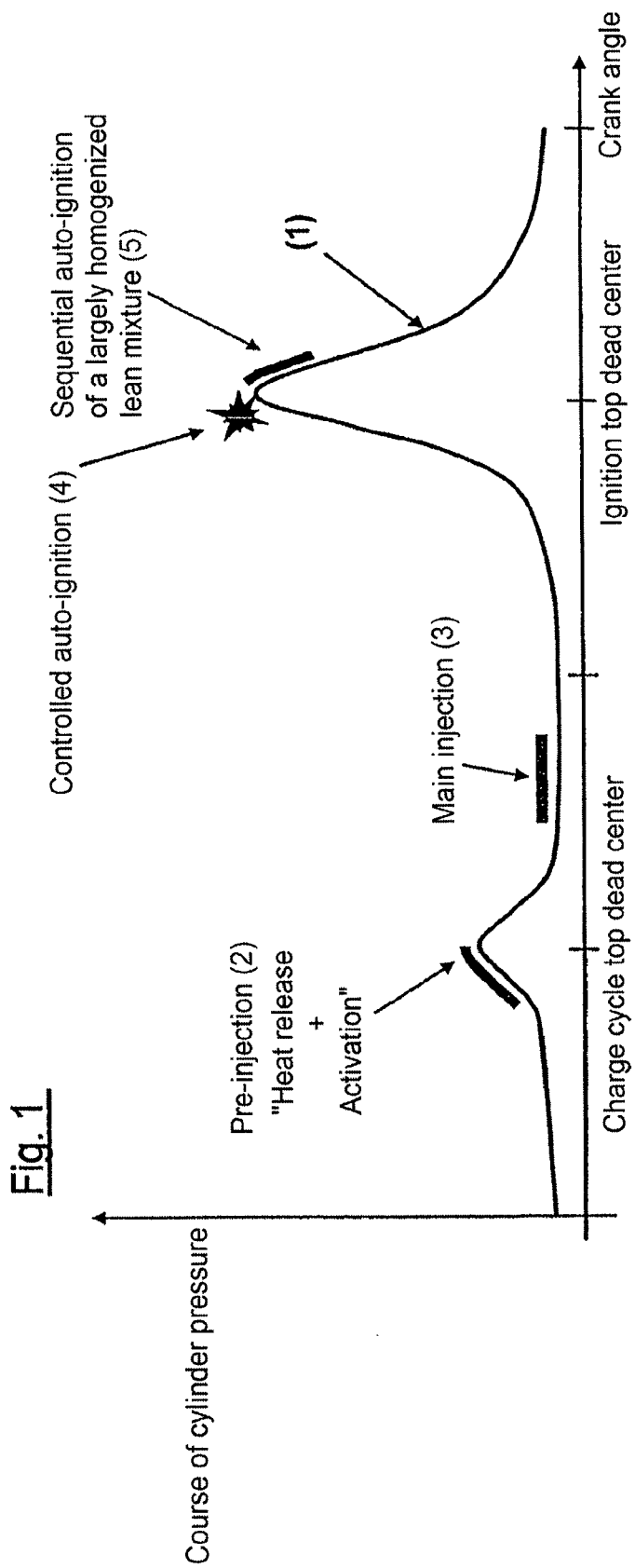
FIG. 1 is a graphical view of a course of an internal pressure of a cylinder for a four-stroke reciprocating internal-combustion engine over a 720° crank angle.

FIG. 1 shows a course 1 of the internal pressure of a cylinder 10 for a four-stroke reciprocating internal-combustion engine over 720° crank angle (° KW; as sensed by crank angle sensor 17). A course (pZYL) of an internal pressure of the cylinder 10 (entered on a Y-axis) over the crankage (° KW) (on the X-axis) is plotted. The pressure course corresponds to a lean HCCI combustion method for a four-stroke reciprocating internal-combustion engine having at least one cylinder in which a combustion chamber is delimited by a cylinder head 12 and a piston 14 is arranged in a reciprocating manner in the cylinder. The volume of the combustion chamber 16 can be changed as a result of the reciprocating capacity of the piston, and a fuel (for example, gasoline, diesel, etc.) can be injected directly into this combustion chamber (e.g., by direct fuel injector 18). In addition, the four-stroke reciprocating internal-combustion engine has at least one charge cycle intake valve 20 and one charge cycle exhaust valve 22 for the charge cycle and, in the combustion chamber, an intermediate compression can be set at a charge cycle top dead center (LWOT). This corresponds to the first pressure rise in FIG. 1 in the area of the charge cycle top dead center (LWOT) on the X-axis. At an ignition top dead center (ZOT), a main compression can be set; this corresponds to the second pressure rise in FIG. 1 in the ignition top dead center (ZOT) area on the X-axis. The lean combustion method has the following process steps after an expansion phase (zero point of the X-axis):

(1) closing the charge cycle exhaust valve before the charge cycle top dead center (LWOT) (e.g., by controller 11 directing valve control device 15 to close exhaust valve 22);

(2) introducing a pilot quantity of fuel in the intermediate compression and compression of the pilot quantity of the fuel and of a residual exhaust gas in the cylinder for forming intermediate products (CH2O, H2O2, CO, C2H4, C3H4, etc.) and/or complete combustion products (CO2, H2O);

(3) opening the charge cycle intake valve after the charge cycle top dead center (LWOT) (e.g., by controller 11 directing valve control device 13 to open intake valve 20) and injecting an intake gas in an intake phase into the combustion chamber;

(4) introducing a main quantity of a fuel into the combustion chamber during the intake phase and/or the main compression phase and closing the charge cycle intake valve;

(5) compressing the intake gas and the fuel in the main compression phase;

(6) igniting a mixture of intake gas and fuel formed in the combustion chamber; and (7) expanding, opening of the charge cycle exhaust valve and, in the expansion phase, pushing out a partial quantity of an exhaust gas formed by a combustion.

The pre-injection 2 of the pilot quantity of fuel as well as the heat release and reformation of the fuel and the main injection 3 are outlined as bars over the cylinder internal pressure curve, which bars are parallel to the course 1 of the internal pressure of the cylinder, in which case, according to the combustion method, the pre-injection 2 is shown before the charge cycle top dead center (LWOT), and the main injection 3 is shown after the charge cycle top dead center (LWOT). The controlled auto-ignition 4 is illustrated by a star in the ignition top dead center (ZOT) area. The further sequential auto-ignition 5 of the largely homogenized lean fuel/air mixture is indicated by a further bar above the pressure course after the ignition top dead center (ZOT). According to an aspect of the invention, the following process steps provide for a controlled conversion of the pilot quantity of the fuel into the intermediate products and/or to the complete combustion products ($CO_2$, $H_2O$):

(1) the introduction of the pilot quantity of the fuel takes place at the latest at the charge cycle top dead center (LWOT), (2) a maximal temperature of the intermediate compression is set by varying the closing point-in-time of the charge cycle exhaust valve, (3) a maximal temperature of the intermediate compression is set by varying the opening point-in-time of the charge cycle intake valve before the charge cycle top dead center (LWOT), and/or (4) a variable compression in the intermediate compression, and/or the mass of the pilot quantity of the fuel, is varied.

The pilot quantity of the fuel is injected into the combustion chamber immediately after the closing of the charge cycle exhaust valve. Furthermore, the pilot quantity preferably amounts to 50% of a total amount of fuel injected per cycle. The ignition of the fuel/air mixture can further take place by an auto-ignition and/or an applied ignition (e.g., by spark plug 24), an auto-ignition being preferred within a wide range. Particularly preferably, the maximal temperature of the intermediate compression during the operation of the internal-combustion engine without an injection of the pilot quantity of the fuel is kept between 900 K and 1,300 K. In addition, particularly preferred intermediate products are formed during the charge cycle top dead center (LWOT) by an undercutting of the charge cycle valves. Further, particularly preferably, the degree of turbulence of the intake air in the cylinder is changed by a variable charge cycle valve stroke and/or by quench areas.

Figure 2:
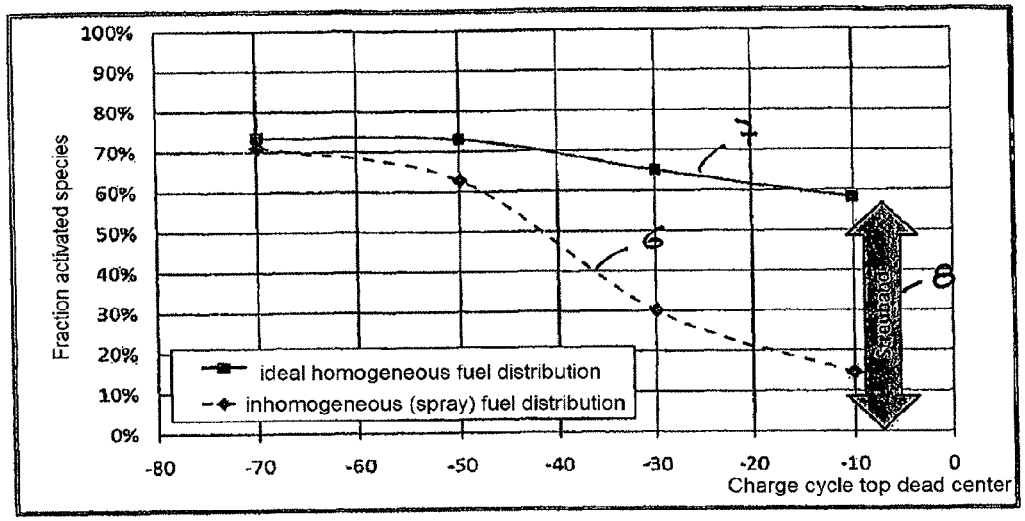
FIG. 2 is a graphical view of a dependence of an activated pilot quantity of fuel on an injection point-in-time.

FIG. 2 is a diagram showing a dependence of an activated pilot quantity of fuel on an injection point-in-time. As in FIG. 3, this involves a numerical simulation. The X-axis is divided into crank angle degrees (° KW), starting at 80° KW before the charge cycle top dead center (LWOT) to the charge cycle top dead center (LWOT). A fraction of activated species [0-100%] of the pilot quantity of fuel is plotted over the Y-axis.

Two graphs 6, 7 are illustrated, one of the graphs having squares and one having diamonds. The diamonds indicate an inhomogeneous fuel spray; the squares indicate a homogeneous fuel/air mixture. These graphs 6, 7 are in each case plotted corresponding to an introduction point-in-time of the fuel into the combustion chamber at 70, 50, 30, 10° KW before the charge cycle top dead center (LWOT). It is clearly recognizable that the fraction of activated species decreases the closer the introduction point-in-time is to the charge cycle top dead center (LWOT). This drop is considerable in the case of inhomogeneous fuel spray. However, a scatter band of activated species is superimposed on this median course of the graph 6, which scatter band will be described in the following.

In DE 198 10 935 C2, it is suggested (graph for an inhomogeneous fuel spray 6) to control the amount of converted to activated fuel by way of the point-in-time of the pre-injection 2. FIG. 2 shows a corresponding dependence of the activated amount of fuel on the injection point-in-time for an injection by means of a real spray. However, in reality, in the case of injection points-in-time close to the charge cycle top dead center (LWOT), i.e., at temperatures in the combustion chamber at which the ignition delay time of the fuel is in the required time period, the fuel will already react before a homogeneous distribution of fuel is present in the combustion chamber. The degree of homogenization will therefore vary from one operating cycle to the next (scatter band 8), and a control of converted to activated fuel will not be possible in practice. This effect is intensified by temperature fluctuations in the retained exhaust gas and fluctuations in the degree of the charge motion.

The influence of the degree of homogenization is illustrated by a consideration of the boundaries which has an ideally homogeneous fuel distribution—the graph for a homogeneous fuel/air mixture 7 and therefore the scattering of the fraction of activated species as a function of the degree of homogenization at injection points-in-time close to the charge cycle top dead center (LWOT). In order to achieve a sufficient homogenization of the pre-injected fuel quantity, the latter has to be injected very early. In the case of the given homogenization, the ignition delay time of the fuel depends essentially on the temperature and the air ratio. This is additionally influenced by the rotational speed because the "time-related aspects" depend on the rotational speed.

If the dependencies of the ignition delay time on the temperature and the air ratio at different rotational speeds are known, according to the invention, the desired quantity of converted or activated fuel can be easily set and controlled by way of these values.

Figure 3:
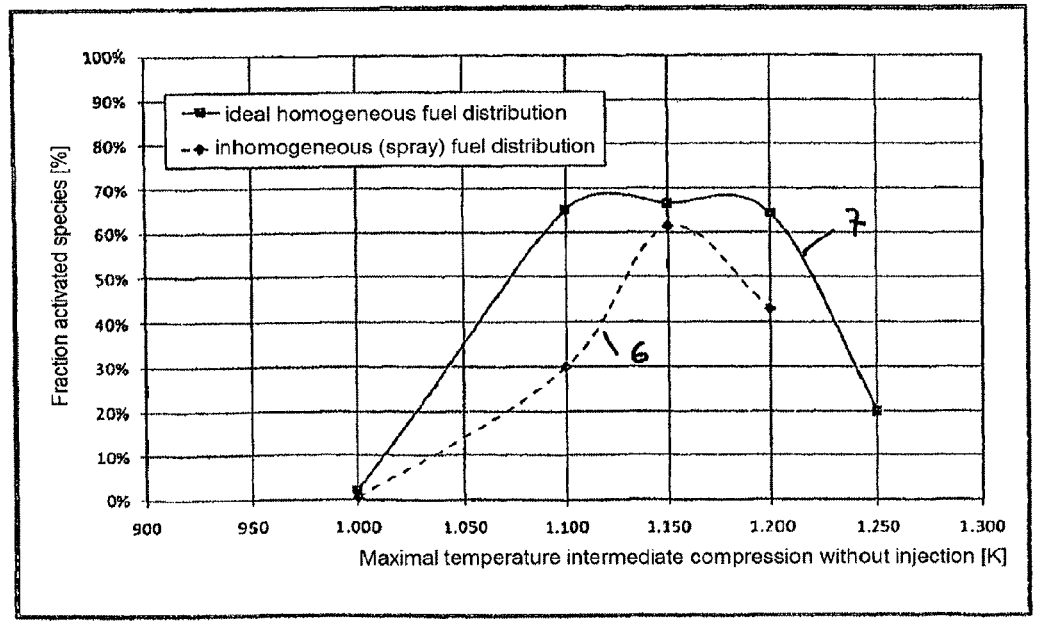
FIG. 3 is a graphical view of an effect of the homogenization degree of a fuel/air mixture on a usable temperature window in an intermediate compression phase.
Figure 4:
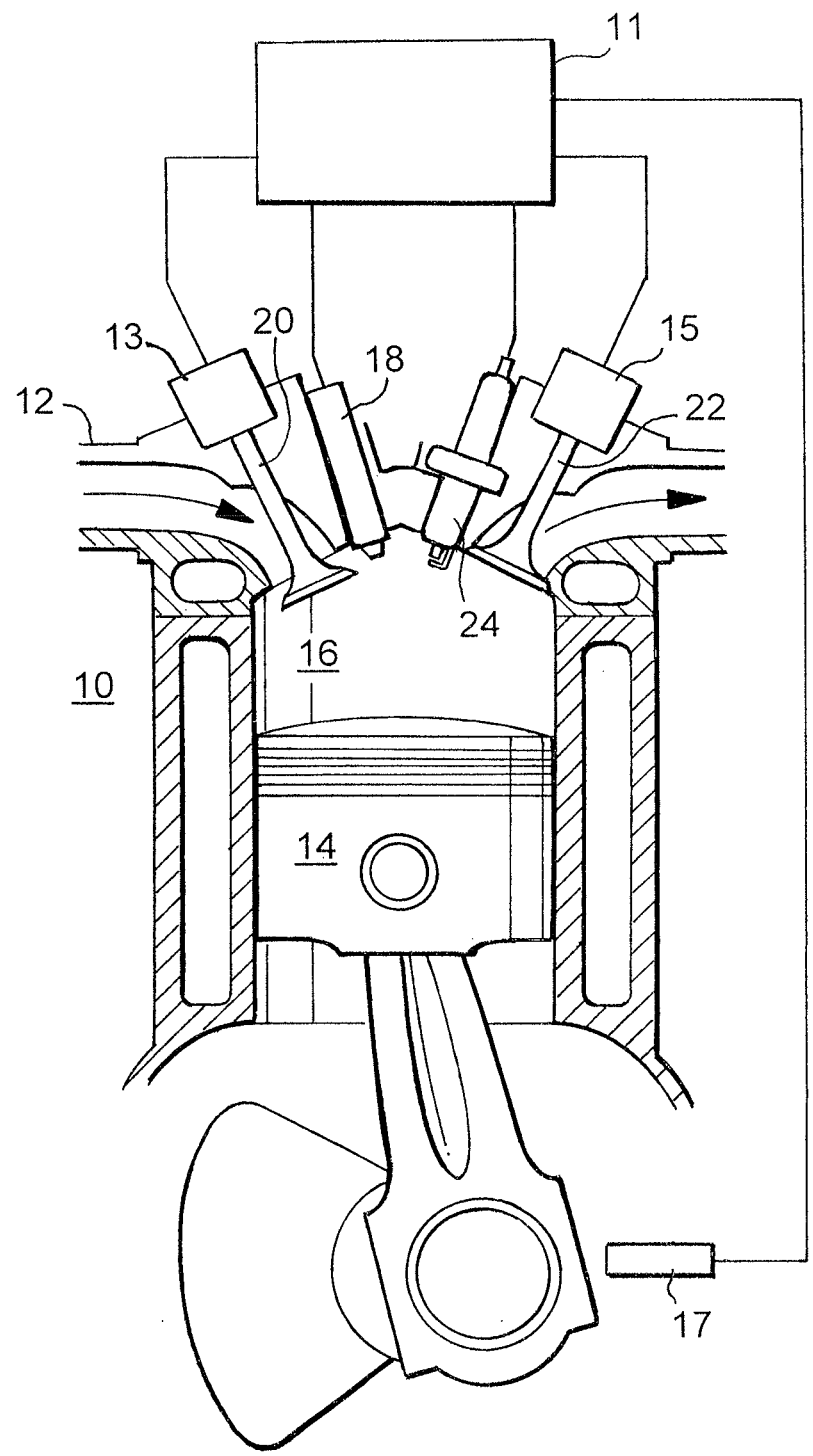
FIG. 4 is a schematic view of an engine combustion chamber and piston.

FIG. 3 is a view of a diagram of the effect of the homogenization degree of the fuel/air mixture on a usable temperature window in an intermediate compression phase.

By way of the X-axis, a temperature of 900 K to 1,300 K in the combustion chamber during the intermediate compression phase is illustrated, which temperature occurs when no pilot quantity of fuel is injected. By way of the Y-axis, the fraction of activated species of fuel [0-100%] is illustrated—again as a graph for an ideally homogenized fuel distribution 7 having squares and as an inhomogeneous spray 6 having diamonds.

It is clearly visible that a very stable high fraction of activated species can be achieved for the homogeneous fuel distribution over a clearly wider temperature range, while only a very narrow temperature window is present for an inhomogeneous spray introduction, in which temperature window a high activation of the fuel is possible.

By use of the method according to the invention, the HCCI operating range is expanded while the consumption, the NOx emissions and the combustion noise are reduced.

Furthermore, this is a lean combustion method that can be used worldwide. In addition, the expenditures and cost for the exhaust gas aftertreatment are reduced because the lean exhaust gas aftertreatment can be eliminated.

LIST OF REFERENCE NUMBERS

1 Course of internal pressure of cylinder
2 Pre-injection
3 Main injection
4 Controlled auto-ignition
5 Sequential auto-ignition
6 Graph of inhomogenous fuel spray
7 Graph of homogenous fuel/air mixture
8 Scatter band The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A lean combustion method for a four-stroke reciprocating internal combustion engine having a cylinder, in which a combustion chamber is delimited by a cylinder head and a piston is moveable in a reciprocating manner to vary a volume of the combustion chamber, a fuel being introduceable directly into the combustion chamber, wherein at least one charge cycle intake valve and one charge cycle exhaust valve are provided for a charge cycle, an intermediate compression being settable in the combustion chamber at a charge cycle top dead center, and a main compression being settable at an ignition top dead center, after an expansion phase comprising the steps of:

closing the charge cycle exhaust valve before the charge cycle top dead center;

introducing a pilot quantity of fuel in the intermediate compression and compressing the pilot quantity of fuel and a residual exhaust gas in the cylinder for forming at least one of intermediate products and complete combustion products;

opening the charge cycle intake valve after the charge cycle top dead center and introducing an intake gas in an intake phase into the combustion chamber;

introducing a main quantity of a fuel into the combustion chamber during at least one of the intake phase and the main compression phase, and closing the charge cycle intake valve;

compressing the intake gas and the fuel in the main compression phase;

igniting a mixture of the intake gas and fuel formed in the combustion chamber;

expanding, opening the charge cycle exhaust valve and, in the expansion phase, pushing out a partial quantity of an exhaust gas formed by a combustion;

wherein a controlled conversion of the pilot quantity of fuel to said at least one of the intermediate products and the complete combustion products is carried out by at least one of the following:

introducing the pilot quantity of fuel at a latest by the charge cycle top dead center;

setting a maximal intermediate-compression temperature by varying a closing point-in-time of the charge cycle exhaust valve;

setting a maximal intermediate-compression temperature by varying an opening point-in-time of the charge cycle intake valve before the charge cycle top dead center; and varying a mass of the pilot quantity of the fuel, wherein the introducing of the pilot quantity of the fuel occurs immediately after the closing of the charge cycle exhaust valve, and wherein the pilot quantity of fuel is at a maximum 50% of a total quantity of fuel.

2. The lean combustion method according to claim 1, wherein the act of igniting the mixture occurs via at least one of an auto-ignition and an applied ignition.

3. The lean combustion method according to claim 2, wherein the maximal intermediate-compression temperature during operation of the internal-combustion engine without fuel injection is between 900 K and 1,300 K.

4. The lean combustion method according to claim 3, further comprising the act of:

changing a degree of turbulence of intake air in the cylinder via a variable charge cycle valve stroke and/or via quench areas.

5. The lean combustion method according to claim 1, wherein the maximal intermediate-compression temperature during operation of the internal-combustion engine without fuel injection is between 900 K and 1,300 K.

6. The lean combustion method according to claim 1, wherein said intermediate products are formed during the charge cycle top dead center by an undercutting of the charge cycle valves.

7. The lean combustion method according to claim 1, further comprising the step of:

changing a degree of turbulence of intake air in the cylinder via a variable charge cycle valve stroke and/or via quench areas.

\* \* \* \* \*